United States Patent Office 3,448,481
Patented June 10, 1969

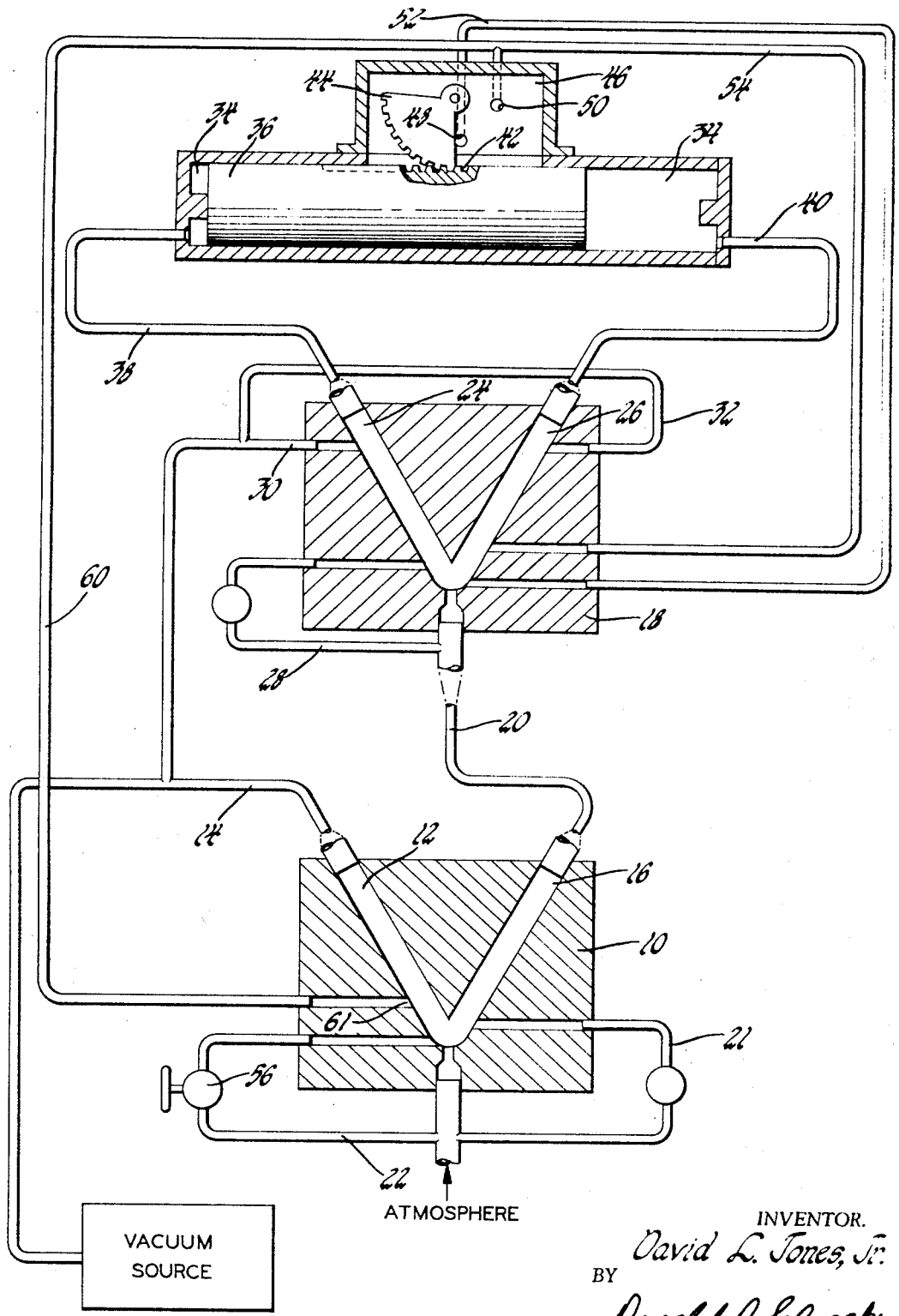

3,448,481
FLUID PRESSURE OPERATED WINDSHIELD WIPER SYSTEM
David L. Jones, Jr., Dayton, Ohio, assignor to General Motors Corporation, Detroit, Mich., a corporation of Delaware
Filed Feb. 16, 1967, Ser. No. 616,624
Int. Cl. A47l 1/02; B60s 1/12; F15b 13/02
U.S. Cl. 15—250.3                                    5 Claims

ABSTRACT OF THE DISCLOSURE

In a preferred form, this disclosure describes a plurality of fluid amplifiers in series, with the output of the second amplifier in the series alternately pressurizing opposite sides of a windshield wiper drive mechanism piston. The first amplifier in the series is a memory type with the second in the series being the "and" logic type with a hysteresis controlled shift-back.

---

This invention relates to windshield wiping mechanism and more particularly to a fluid amplifier controlled pneumatic piston drive therefor.

Windshield wipers driven by vacuum are common in the prior art but they generally require vacuum pressure operating a servo motor to oscillate windshield wipers across a windshield. The present invention contemplates a rack and pinion drive arrangement powered by a piston which is alternately positively pressurized on one side while the opposite side is under vacuum in order to get a positive drive. The volume of vacuum needed to accomplish the driving of the piston is very small in comparison to the vacuum motors shown in the prior art and this is made possible by the novel use of fluid amplifiers in series which utilize a differential pressure at the two output legs of a control amplifier communicated to opposite sides of the drive piston. The reversal of the piston at the appropriate point to gain a symmetrical wipe pattern is brought about by reversing the pressures on either side of the drive piston by a hysteresis effect of a high memory monostable fluid amplifier at one end of travel and an "and" logic action at an opposite end of travel.

It is an object of the present invention to provide an improved vacuum driven windshield wiper motor controlled by fluid amplifiers in series.

It is another object of the present invention to provide an improved windshield wiper drive mechanism utilizing a rack carried by a pressure responsive piston directly acting on a pinion to oscillate windshield wiper blades through a desired pattern on a windshield.

It is still another object of the present invention to utilize the switching capabilities of an "and" logic high memory type fluid amplifier to alternately negatively and positively pressurize opposite sides of a freely slidable piston to gain an oscillatory motion that is translated into a predetermined pattern on a windshield through a windshield wiper arm and blade arrangement.

Further objects and advantages of the present invention will be apparent from the following description, reference being had to the acocmpanying drawing wherein a preferred embodiment of the present invention is clearly shown.

In the drawing:
In the single figure drawing, a diagrammatic illustration of the fluid circuit of the subject invention is shown.

Referring to the drawing, a first fluid amplifier 10 has one output leg 12 connected to a vacuum source through line 14 and another output leg 16 providing a power input to a second fluid amplifier 18 through line 20. Fluid amplifier 10 has a preadjusted bias circuit 21 controlling flow through leg 16 and an on/off circuit 22 controlling flow through leg 12.

The second fluid amplifier 18 has a power stream input from line 20. The power stream in fluid amplifier 18 is alternately shifted to leg 24 or to leg 26. Fluid amplifier 18 is biased through a bias circuit 28 resulting in amplifier 18 having a high memory toward leg 26. Leg 24 is in fluid communication with the vacuum source through line 30, and leg 26 communicates with the vacuum source through line 32.

Leg 24 communicates with chamber 34 on one side of piston 36 through line 38 and leg 26 correspondingly communicates with the opposite side of piston 36 in chamber 34 through line 40. Piston 36 has a rack portion 42 engaging pinion 44 to drive windshield wiper arms and blades of conventional construction across a windshield to wipe a predetermined area thereon. Chamber 46 is formed integrally with cylinder 34 and is under atmospheric pressure. Outlets 48 and 50 communicate with leg 26 through lines 52 and 54, respectively, and together give second fluid amplifier 18 its "and" logic capability. In addition, outlets 48 and 50 must both be covered before a reshifting of fluid amplifier 18 is effected which acts in hysteresis fashion to hold the power stream in leg 26 until both bias pressures through lines 52 and 54 are felt in leg 26.

In operation, on/off valve 56 is opened to set the system herein described into motion. It should be understood that sector gear or pinion 44, as viewed in the drawing, is illustrated in the position it assumes during the operation of the subject system when piston 36 is completely disposed in an extreme of movement in cylinder 34.

Before valve 56 is opened, the flow through amplifier 10 is from the atmosphere through leg 12 and line 14 to the vacuum source. When valve 56 is opened, a bias flow is set up in circuit 22 which causes a shifting in amplifier 10 of the power stream from the atmopshere to leg 16. The power stream input through the second fluid amplifier 18 results in flow up leg 26 resulting in a lower pressure in leg 24 than in leg 26. This flow is due to the preset bias of circuit 28.

With the flow up leg 26, the right side of piston 36 is more positively pressurized and the left side of piston 36 is more negatively pressurized. This results in a sliding movement of piston 36 toward the position in which it is illustrated in the drawing. When pinion 44 moves to the position shown in the drawing, outlet 50 at first and later outlet 48 is uncovered by the sector gear body or pinion 44. With the uncovering of outlet 48, the "and" logic requirement of the amplifier is satisfied and the resultant of positive pressure at leg 26 results in a shift of the power stream to leg 24. It should be noted that outlet 48 is uncovered when piston 36 is at its leftward extreme of movement and the windshield wipers driven by sector gear 44 are at an extreme of the wipe pattern.

With a shifting of the power stream to leg 24, the left side of piston 36 becomes more positively pressurized than the right side resulting in an immediate movement of piston 36 to the right, as viewed in the drawing. Outlet 48 is almost immediately covered but the hysteresis in fluid amplifier 18 is not overcome until outlet 50 is also covered. When piston 36 has shifted completely to the right, as viewed in the drawing, both outlets 50 and 48 are covered resulting in bias circuit 28 becoming dominant, resulting in a shift of the power stream in fluid amplifier 18 to leg 26. This cycle of operation will be continuously repeated as long as on/off valve 56 remains open. The speed of the cycle is, of course, controlled by the amount that valve 56 is open.

The subject system also has the capability of always ending a cycle with piston 36 at the extreme of rightward movement wherein outlets 50 and 48 are covered due to the preset hysteresis of amplifier 18 and fixed bias control circuit 21. No matter in which part of the cycle piston 36 is disposed when valve 56 is closed, the power stream from line 20 will not shift from leg 24 until the control bias in lines 52 and 54 to leg 26 is satisfied. No reshift will thereafter occur when valve 56 is closed because bias control 22 results in a shift of the power stream in fluid amplifier 10 to leg 12 which creates a static condition for the system. This shift occurs after a flow from 50–60–61 ceases because this flow continues as long as inlet 50 remains uncovered.

It is clear that the utility of the fluid amplifier series circuit set forth in the present invention is made possible by the unique combination of multivented fluid amplifiers utilizing the high memory of certain designed amplifiers coupled with an "and" logic capability with hysteresis control for reset. The combination of the above-mentioned fluid amplifier characteristics results in an even oscillatory movement of a piston appropriately connected to a windshield wiper drive mechanism of common design to operate same. It is also clear that the volume of vacuum necessary to operate the subject system is much less than that required in the conventional vacuum motors precluding the problems normally attendant vacuum motors when fluctuations in volume from the vacuum source occur.

While the embodiment of the present invention, as herein disclosed, constitutes a preferred form, it is to be understood that other forms might be adopted.

What is claimed is:

1. A windshield wiping system for wiping a windshield of an automotive vehicle comprising: a drive means including a slide means for reciprocating a windshield wiper across the windshield; first and second pressure sources of different magnitude; control means for alternately communicating the opposite ends of the slide means with said first and second pressure sources to effect reciprocation of said slide means, said control means including a first fluid amplifier means having an inlet and a pair of outlet legs which are respectively in communication with the opposite ends means of said slide means and also in communication with said first pressure source, a second fluid amplifier means having an inlet in communication with said second pressure source and first and second outlet legs, said first outlet leg being in communication with said first pressure source and said other outlet leg being in communication with said inlet of said first fluid amplifier means, said second pressure source flowing through said inlet of said second fluid amplifier means being normally biased so as to flow through said first outlet leg of said second amplifier means, means including a manually manipulatable control for switching and biasing the flow of fluid from said second pressure source through said second outlet leg of said second fluid amplifier means, and means responsive to the position of said slide means to shift the flow of fluid from one outlet leg to the other outlet leg of said first fluid amplifier means.

2. A windshield wiping system as defined in claim 1 wherein said first pressure source is a vacuum pressure source and wherein said second pressure source is the atmosphere.

3. A vehicle windshield wiping system comprising: wiper arms and blades pivotably mounted on a vehicle and adapted to wipe a windshield thereof; drive means for said windshield wiper arms including a first portion for oscillating said wiper blades across the windshield and acting as a valve; piston means slidably disposed in a chamber and engaging said first portion; vacuum pressure and atmospheric pressure sources arranged to selectively communicate pressures to opposite sides of said piston to reciprocate said piston in said chamber driving said first portion in a to and fro movement; and fluid amplifier means connected in series with a vacuum controlled bias in turn controlling fluid flow from the atmosphere to each side of said piston means and coacting with said first portion to selectively shift a fluid stream in response to a vacuum induced bias system.

4. A vehicle windshield wiping system comprising: wiper blades carried by arms pivotally mounted near the windshield of a vehicle and adapted to be oscillatable thereacross; drive means for oscillating said windshield wiper arms to clear a predetermined area on the windshield; a sector gear pivotally supported on the vehicle and engaging said drive means to oscillate the windshield wiper arms and blades; a chamber carried parallel to the longitudinal axis of the windshield; piston means slidably disposed in said chamber and having a rack portion formed on the exterior of said piston means engaging said sector gear; second fluid amplifier means having a high memory and being of the "and" logic type having outputs communicating with said chamber on either side of said piston; and first fluid amplifier means having a fixed bias and controllable bias input from the atmosphere with one leg of said amplifier supplying a power stream to said second fluid amplifier means which is alternately routed through output legs of said second fluid amplifier means to either side of said piston to cause a reciprocatory motion of said piston in said chamber thereby driving said sector gear and drive means in a manner causing oscillatory movement of the windshield wiper arms and blades across the windshield.

5. A vehicle windshield wiping system according to claim 4 wherein said second fluid amplifier means includes a dual atmospheric pressure bias giving said second fluid amplifier means an "and" logic capability with a hysteresis controlled reverse shifting controlled by said sector gear uncovering a plurality of ports in said chamber situated contiguous to said sector gear.

References Cited

UNITED STATES PATENTS

| 1,618,068 | 2/1927  | Dayton   | 15—250.3     |
| 2,112,198 | 3/1938  | Horton   | 15—250.3     |
| 2,218,719 | 10/1940 | Richards | 15—250.12 XR |
| 3,124,999 | 3/1964  | Woodward | 91—3         |

PETER FELDMAN, Primary Examiner.

U.S. Cl. X.R.

15—250.12; 91—3; 137—81.5